United States Patent [19]
Croteau et al.

[11] Patent Number: 5,675,621
[45] Date of Patent: Oct. 7, 1997

[54] REDUCED HEIGHT FLAT SPRING SPACER FOR NUCLEAR FUEL RODS

[75] Inventors: Edward A. Croteau; Thomas G. Evans; Robert B. Elkins, all of Wilmington, N.C.

[73] Assignee: General Electric Company, Schenectady, N.Y.

[21] Appl. No.: 516,203

[22] Filed: Aug. 17, 1995

[51] Int. Cl.$^6$ .................................................. G21C 3/34
[52] U.S. Cl. .......................... 376/441; 376/442; 376/438; 376/462
[58] Field of Search .......................... 376/438–442, 376/448, 462

[56] References Cited

U.S. PATENT DOCUMENTS

| | | | |
|---|---|---|---|
| 3,344,855 | 10/1967 | Clark | 168/159 |
| 3,350,276 | 10/1967 | Warberg et al. | 176/68 |
| 3,457,140 | 7/1969 | Glandin | 176/68 |
| 3,664,924 | 5/1972 | Krawiec | 376/442 |
| 3,749,640 | 7/1973 | Israel | 176/68 |
| 3,762,996 | 10/1973 | Milburn et al. | 376/442 |
| 3,801,452 | 4/1974 | Milburn | 376/442 |
| 3,809,609 | 5/1974 | Krawiec et al. | 176/68 |
| 3,886,038 | 5/1975 | Raven | 176/68 |
| 3,944,779 | 3/1976 | Umino et al. | 219/121.14 |
| 4,005,521 | 2/1977 | Kaplan et al. | 29/469 |
| 4,039,379 | 8/1977 | Patterson et al. | 376/439 |
| 4,061,536 | 12/1977 | Creagan et al. | 376/439 |
| 4,069,102 | 1/1978 | Berringer et al. | 376/463 |
| 4,077,843 | 3/1978 | Patterson et al. | 376/442 |
| 4,086,809 | 5/1978 | Wu et al. | 73/161 |
| 4,089,742 | 5/1978 | Amaral et al. | 376/440 |
| 4,108,719 | 8/1978 | Olshausen | 376/245 |
| 4,119,489 | 10/1978 | Itoh et al. | 376/444 |

(List continued on next page.)

FOREIGN PATENT DOCUMENTS

| | | |
|---|---|---|
| 0 192 534 | 8/1986 | European Pat. Off. . |
| 0 192 092 | 1/1989 | European Pat. Off. . |
| 0 307 705 | 3/1989 | European Pat. Off. . |
| 0 210 526 | 5/1989 | European Pat. Off. . |
| 0 237 064 | 3/1991 | European Pat. Off. . |
| 0 428 092 | 5/1991 | European Pat. Off. . |
| 0 428 093 | 5/1991 | European Pat. Off. . |
| 0 273 183 | 8/1991 | European Pat. Off. . |
| 0 489 334 | 6/1992 | European Pat. Off. . |
| 0 503 553 | 9/1992 | European Pat. Off. . |
| 0 514 115 | 11/1992 | European Pat. Off. . |
| 0 514 116 | 11/1992 | European Pat. Off. . |
| 0 514 117 | 11/1992 | European Pat. Off. . |
| 0 514 120 | 11/1992 | European Pat. Off. . |
| 0 330 013 | 11/1992 | European Pat. Off. . |
| 0 518 306 | 12/1992 | European Pat. Off. . |
| 0 539 867 | 5/1993 | European Pat. Off. . |
| 74 23317 | 3/1975 | France . |
| 75 40306 | 12/1975 | France . |
| 1 564 219 | 2/1970 | Germany . |
| 2 227 970 | 12/1973 | Germany . |
| 15 64 697 | 1/1975 | Germany . |

(List continued on next page.)

*Primary Examiner*—Michael J. Carone
*Assistant Examiner*—Matthew J. Lattig
*Attorney, Agent, or Firm*—Nixon & Vanderhye

[57] ABSTRACT

A spacer for a nuclear fuel bundle comprises a plurality of discrete, generally cylindrical ferrules, with each ferrule having a pair of circumferentially spaced fuel rod contacting portions along one side of the ferrule and three superposed openings in the ferrule along an opposite side thereof. A leaf spring having opposite end projecting portions and a central projecting portion is disposed between adjacent ferrules with the end projecting portions and the central portion disposed within the openings of the ferrule. The central portion includes a boss projecting inwardly for engagement against the fuel rod in one ferrule and the end projections contain bosses projecting inwardly and spaced from the fuel rod of the one ferrule. The end projections bear against an adjacent ferrule. The spring is captured between the two ferrules and contacts the ferrules at a plurality of laterally and vertically spaced contact points so that the spring is stabilized against flow-induced vibration.

18 Claims, 5 Drawing Sheets

U.S. PATENT DOCUMENTS

| | | | |
|---|---|---|---|
| 4,124,444 | 11/1978 | Jabsen | 376/442 |
| 4,125,435 | 11/1978 | Jabsen | 376/442 |
| 4,137,125 | 1/1979 | Walters | 376/442 |
| 4,142,934 | 3/1979 | Wild | 376/434 |
| 4,172,761 | 10/1979 | Raven et al. | 376/462 |
| 4,175,003 | 11/1979 | Beuchel et al. | 376/442 |
| 4,190,494 | 2/1980 | Olsson | 376/462 |
| 4,224,107 | 9/1980 | Delafosse et al. | 376/462 |
| 4,239,597 | 12/1980 | Christiansen | 376/441 |
| 4,246,783 | 1/1981 | Steven et al. | 73/161 |
| 4,268,356 | 5/1981 | Kmonk et al. | 376/462 |
| 4,312,705 | 1/1982 | Steinke | 376/441 |
| 4,313,797 | 2/1982 | Attix | 376/441 |
| 4,325,786 | 4/1982 | Wohlsen | 376/442 |
| 4,357,298 | 11/1982 | Wolters, Jr. et al. | 376/441 |
| 4,391,771 | 7/1983 | Anthony | 376/451 |
| 4,396,573 | 8/1983 | Feutrel | 376/442 |
| 4,416,852 | 11/1983 | Nylund | 376/438 |
| 4,418,036 | 11/1983 | Gjertsen et al. | 376/438 |
| 4,420,458 | 12/1983 | Dunlap et al. | 376/447 |
| 4,435,357 | 3/1984 | Krieger | 376/272 |
| 4,454,093 | 6/1984 | Nylund et al. | 376/282 |
| 4,474,730 | 10/1984 | Hellman et al. | 376/462 |
| 4,478,786 | 10/1984 | Andersson et al. | 376/444 |
| 4,489,038 | 12/1984 | Nylund | 376/446 |
| 4,491,540 | 1/1985 | Larker et al. | 252/628 |
| 4,492,844 | 1/1985 | Kobuck et al. | 219/121 |
| 4,499,047 | 2/1985 | Borrman et al. | 376/434 |
| 4,508,679 | 4/1985 | Matzner et al. | 376/438 |
| 4,512,820 | 4/1985 | Mori et al. | 148/677 |
| 4,521,374 | 6/1985 | Duncan | 376/462 |
| 4,522,330 | 6/1985 | Kerrey et al. | 228/182 |
| 4,526,744 | 7/1985 | Borrman et al. | 376/440 |
| 4,526,745 | 7/1985 | Nylund et al. | 376/444 |
| 4,526,746 | 7/1985 | Fredin | 376/444 |
| 4,540,545 | 9/1985 | Kondo | 376/364 |
| 4,544,522 | 10/1985 | Curulla et al. | 376/441 |
| 4,556,531 | 12/1985 | Curulla | 376/441 |
| 4,557,892 | 12/1985 | Komoda | 376/412 |
| 4,571,324 | 2/1986 | Johansson et al. | 376/441 |
| 4,578,240 | 3/1986 | Cadwell | 376/441 |
| 4,579,711 | 4/1986 | Mishima et al. | 376/442 |
| 4,585,614 | 4/1986 | Helmersson | 376/434 |
| 4,585,616 | 4/1986 | DeMario et al. | 376/442 |
| 4,587,093 | 5/1986 | Borrman et al. | 376/444 |
| 4,587,704 | 5/1986 | Matzner et al. | 29/446 |
| 4,588,550 | 5/1986 | Blomstrand et al. | 376/438 |
| 4,597,937 | 7/1986 | Sakurai et al. | 376/441 |
| 4,617,170 | 10/1986 | Suchy | 376/438 |
| 4,632,804 | 12/1986 | Wallander et al. | 376/444 |
| 4,645,643 | 2/1987 | LeClercq | 376/447 |
| 4,646,021 | 2/1987 | Brown | 324/303 |
| 4,649,021 | 3/1987 | Taleyarkhan | 376/444 |
| 4,652,426 | 3/1987 | Boyle et al. | 376/352 |
| 4,654,193 | 3/1987 | Amano et al. | 376/436 |
| 4,655,955 | 4/1987 | Freeman et al. | 376/267 |
| 4,656,000 | 4/1987 | Sakurai et al. | 376/352 |
| 4,659,541 | 4/1987 | Rylatt | 376/442 |
| 4,659,542 | 4/1987 | Kerrey | 376/442 |
| 4,659,543 | 4/1987 | Lui | 376/444 |
| 4,661,220 | 4/1987 | Fejes et al. | 205/705 |
| 4,664,882 | 5/1987 | Doshi | 376/423 |
| 4,665,866 | 5/1987 | Wepfer | 122/510 |
| 4,666,657 | 5/1987 | Altman | 376/234 |
| 4,666,663 | 5/1987 | Steinke | 376/441 |
| 4,666,664 | 5/1987 | Doshi | 376/261 |
| 4,671,926 | 6/1987 | Broberg et al. | 376/364 |
| 4,675,154 | 6/1987 | Nelson et al. | 376/444 |
| 4,683,115 | 7/1987 | Frömel | 376/439 |
| 4,686,079 | 8/1987 | Ishikawa et al. | 376/444 |
| 4,689,091 | 8/1987 | Yoshida et al. | 148/672 |
| 4,692,302 | 9/1987 | DeMario et al. | 376/439 |
| 4,692,303 | 9/1987 | Osborne | 376/446 |
| 4,695,426 | 9/1987 | Nylund | 376/441 |
| 4,698,204 | 10/1987 | Taleyarkhan | 376/439 |
| 4,702,881 | 10/1987 | Weiland et al. | 376/442 |
| 4,705,663 | 11/1987 | Steven et al. | 376/442 |
| 4,707,328 | 11/1987 | Arbink et al. | 376/446 |
| 4,708,845 | 11/1987 | Mildrum et al. | 376/435 |
| 4,711,436 | 12/1987 | Kobuck et al. | 269/40 |
| 4,714,585 | 12/1987 | Kast | 376/442 |
| 4,716,011 | 12/1987 | Taleyarkhan | 376/281 |
| 4,716,016 | 12/1987 | DeMario et al. | 376/446 |
| 4,725,403 | 2/1988 | Buettiker | 376/439 |
| 4,726,926 | 2/1988 | Patterson et al. | 376/439 |
| 4,728,490 | 3/1988 | Taleyarkhan | 376/439 |
| 4,729,867 | 3/1988 | DeMario | 376/261 |
| 4,735,766 | 4/1988 | Scharpenberg | 376/245 |
| 4,735,769 | 4/1988 | Lettau | 376/441 |
| 4,738,819 | 4/1988 | Taleyarkhan | 376/444 |
| 4,738,821 | 4/1988 | Shallenberger et al. | 376/444 |
| 4,740,350 | 4/1988 | Taleyarkhan | 376/441 |
| 4,740,351 | 4/1988 | Katsumizu et al. | 376/446 |
| 4,744,942 | 5/1988 | Ferrari et al. | 376/442 |
| 4,749,547 | 6/1988 | Blomstrand et al. | 376/444 |
| 4,753,774 | 6/1988 | Taleyarkhan et al. | 376/444 |
| 4,756,878 | 7/1988 | King et al. | 376/439 |
| 4,758,403 | 7/1988 | Noailly | 376/439 |
| 4,759,912 | 7/1988 | Taleyarkhan | 376/435 |
| 4,770,843 | 9/1988 | Taleyarkhan | 376/216 |
| 4,775,509 | 10/1988 | Noailly et al. | 376/442 |
| 4,780,273 | 10/1988 | Dressel | 376/481 |
| 4,784,825 | 11/1988 | Busselman et al. | 376/399 |
| 4,793,963 | 12/1988 | DeMario et al. | 376/267 |
| 4,795,608 | 1/1989 | Nylund | 376/444 |
| 4,803,043 | 2/1989 | DeMario et al. | 376/442 |
| 4,804,516 | 2/1989 | Thomazet et al. | 376/439 |
| 4,818,471 | 4/1989 | Thomson et al. | 376/254 |
| 4,818,473 | 4/1989 | Lui | 376/261 |
| 4,818,478 | 4/1989 | Taleyarkhan | 376/435 |
| 4,828,782 | 5/1989 | Donnelly | 376/252 |
| 4,839,136 | 6/1989 | DeMario et al. | 376/462 |
| 4,844,860 | 7/1989 | Hatfield | 376/439 |
| 4,849,161 | 7/1989 | Brown et al. | 376/439 |
| 4,859,407 | 8/1989 | Nylund | 376/446 |
| 4,869,865 | 9/1989 | White et al. | 376/260 |
| 4,879,090 | 11/1989 | Perrotti et al. | 376/462 |
| 4,885,127 | 12/1989 | Yokoyama | 376/462 |
| 4,895,698 | 1/1990 | DeMario | 376/442 |
| 4,913,707 | 4/1990 | Moreno et al. | 29/792 |
| 4,913,875 | 4/1990 | Johansson et al. | 376/439 |
| 4,924,586 | 5/1990 | King, Jr. et al. | 29/723 |
| 4,931,615 | 6/1990 | Muncy et al. | 219/121.67 |
| 4,946,587 | 8/1990 | Reeves et al. | 209/539 |
| 4,957,697 | 9/1990 | Wada | 376/442 |
| 4,970,048 | 11/1990 | Noailly | 376/439 |
| 4,980,121 | 12/1990 | Roberts et al. | 376/439 |
| 4,988,474 | 1/1991 | Hoffmann et al. | 376/261 |
| 4,994,234 | 2/1991 | Nylund | 376/445 |
| 4,999,153 | 3/1991 | Johansson et al. | 376/443 |
| 5,002,726 | 3/1991 | Johansson | 376/448 |
| 5,024,807 | 6/1991 | Hatfield et al. | 376/352 |
| 5,024,810 | 6/1991 | Bachman | 376/438 |
| 5,032,351 | 7/1991 | Johansson | 376/438 |
| 5,035,853 | 7/1991 | Lettau et al. | 376/441 |
| 5,069,864 | 12/1991 | Johansson | 376/441 |
| 5,078,961 | 1/1992 | Johansson et al. | 376/448 |
| 5,080,858 | 1/1992 | Nylund | 376/443 |
| 5,085,827 | 2/1992 | Johansson et al. | 376/444 |
| 5,089,220 | 2/1992 | Nylund | 376/439 |
| 5,089,221 | 2/1992 | Johansson et al. | 376/442 |
| 5,091,145 | 2/1992 | Petit | 376/441 |

| | | | | | | | |
|---|---|---|---|---|---|---|---|
| 5,094,805 | 3/1992 | Suchy et al. | 376/438 | 5,375,756 | 12/1994 | Haughton et al. | 228/10 |
| 5,096,660 | 3/1992 | Hembjer et al. | 376/438 | 5,377,236 | 12/1994 | Smith et al. | 376/245 |
| 5,110,539 | 5/1992 | Perrotti et al. | 376/439 | 5,488,644 | 1/1996 | Johansson | 376/441 |
| 5,128,097 | 7/1992 | Fukasawa et al. | 376/438 | 5,519,747 | 5/1996 | Johansson et al. | 376/442 |
| 5,130,083 | 7/1992 | Johansson | 376/441 | 5,526,387 | 6/1996 | Johansson et al. | 376/439 |
| 5,139,736 | 8/1992 | Bryan | 376/442 | 5,546,437 | 8/1996 | Matzner et al. | 376/442 |
| 5,147,600 | 9/1992 | Kadono et al. | 376/462 | 5,566,217 | 10/1996 | Croteau et al. | 376/442 |
| 5,149,495 | 9/1992 | Elkins | 376/444 | | | | |
| 5,173,252 | 12/1992 | Johansson | 376/448 | | | | |
| 5,174,949 | 12/1992 | Johansson | 376/439 | | | | |
| 5,178,825 | 1/1993 | Johansson | 376/438 | | | | |
| 5,180,548 | 1/1993 | Verdier | 376/439 | | | | |
| 5,180,550 | 1/1993 | Nylund | 376/449 | | | | |
| 5,183,629 | 2/1993 | Canat et al. | 376/439 | | | | |
| 5,186,891 | 2/1993 | Johansson et al. | 376/438 | | | | |
| 5,200,143 | 4/1993 | Johansson | 376/449 | | | | |
| 5,209,899 | 5/1993 | Johansson et al. | 376/442 | | | | |
| 5,211,908 | 5/1993 | Verdier | 376/442 | | | | |
| 5,226,633 | 7/1993 | Willard, Jr. | 267/159 | | | | |
| 5,229,068 | 7/1993 | Johansson et al. | 376/371 | | | | |
| 5,243,634 | 9/1993 | Bryan | 376/439 | | | | |
| 5,245,644 | 9/1993 | Büttner et al. | 376/442 | | | | |
| 5,253,278 | 10/1993 | Kanazawa et al. | 376/434 | | | | |
| 5,263,071 | 11/1993 | Farkas et al. | 376/438 | | | | |
| 5,272,743 | 12/1993 | Yamazaki et al. | 376/463 | | | | |
| 5,313,506 | 5/1994 | Matzner et al. | 376/441 | | | | |
| 5,317,613 | 5/1994 | Fennern | 376/439 | | | | |
| 5,327,470 | 7/1994 | Johansson | 376/438 | | | | |
| 5,343,504 | 8/1994 | Gaylord, Jr. et al. | 376/247 | | | | |
| 5,345,487 | 9/1994 | Johansson | 376/444 | | | | |
| 5,361,288 | 11/1994 | Johansson | 376/441 | | | | |
| 5,371,768 | 12/1994 | Matzner | 376/441 | | | | |
| 5,375,154 | 12/1994 | Matzner et al. | 228/10 | | | | |

FOREIGN PATENT DOCUMENTS

| | | |
|---|---|---|
| 24 17 326 | 9/1976 | Germany . |
| 24 37 285 | 1/1977 | Germany . |
| 26 31 923 | 2/1978 | Germany . |
| 28 23 899 | 12/1979 | Germany . |
| 32 02 238 | 9/1982 | Germany . |
| 33 30 850 | 3/1985 | Germany . |
| 33 34 974 | 4/1985 | Germany . |
| 33 41 966 | 5/1985 | Germany . |
| 35 04 640 | 8/1986 | Germany . |
| 35 19 882 | 12/1986 | Germany . |
| 35 27 680 | 2/1987 | Germany . |
| 36 32 153 | 3/1988 | Germany . |
| 38 02 848 | 8/1988 | Germany . |
| 40 13 397 | 10/1990 | Germany . |
| 41 18 124 | 12/1992 | Germany . |
| 1-1384493 | 5/1989 | Japan . |
| 2-163695 | 6/1990 | Japan . |
| 327 019 | 7/1968 | Sweden . |
| 312 612 | 7/1969 | Sweden . |
| 454 823 | 5/1988 | Sweden . |
| 454 824 | 5/1988 | Sweden . |
| 1153444 | 5/1969 | United Kingdom . |

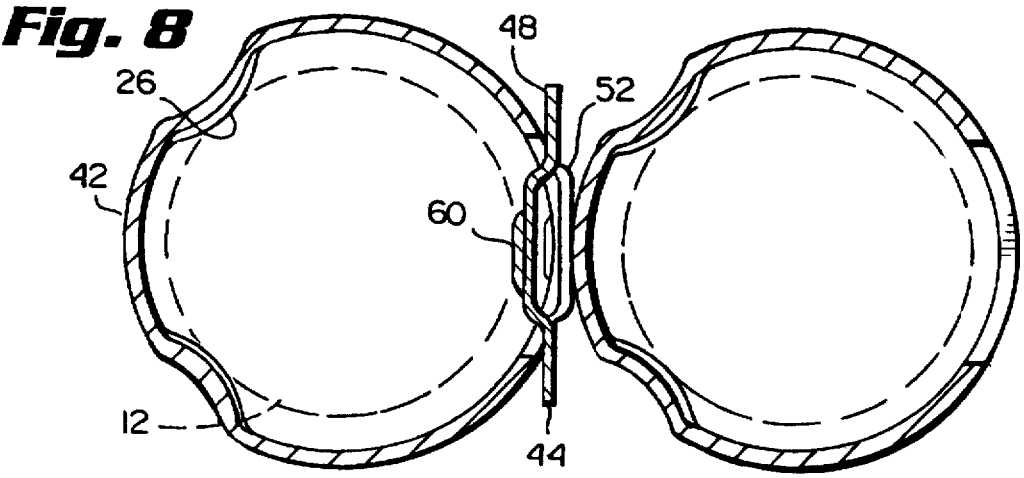
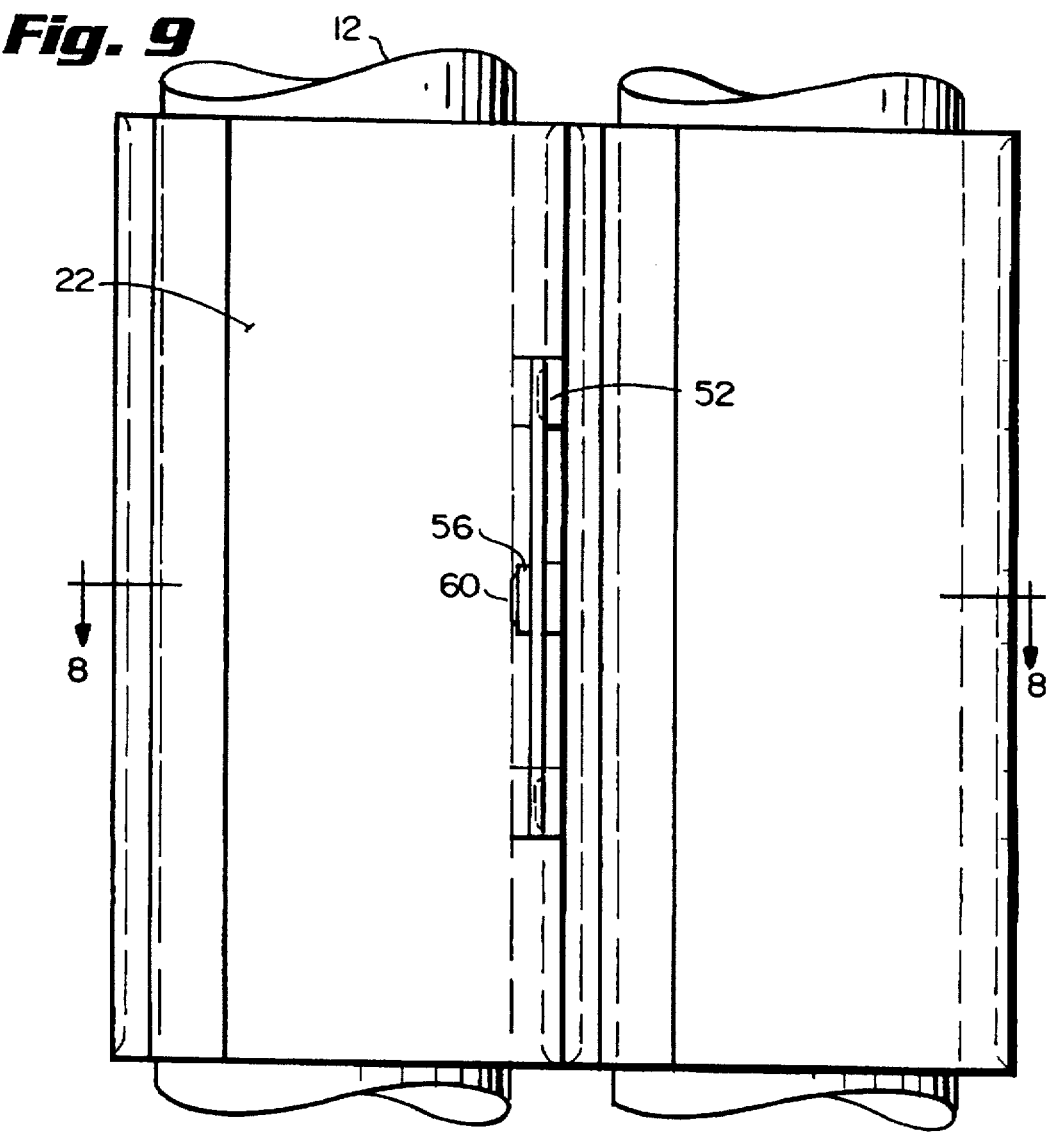

5,675,621

1

REDUCED HEIGHT FLAT SPRING SPACER FOR NUCLEAR FUEL RODS

TECHNICAL FIELD

The present invention relates to a spacer for nuclear fuel rods and particularly to a reduced height flat spring spacer having minimum spacer material with consequent reduced impact on fuel bundle performance.

BACKGROUND

In nuclear reactors, for example, a boiling water reactor, nuclear fuel rods are grouped together in an open-ended tubular flow channel, typically referred to as a fuel assembly or bundle. A plurality of fuel assemblies are positioned in the reactor core in a matrix and a coolant/moderator flows upwardly about the fuel rods for generating steam. Fuel rods are supported between upper and lower tie plates in side-by-side parallel arrays. Spacers are employed at predetermined elevations along the fuel bundle to restrain the fuel rods from bowing or vibrating during reactor operation.

Typical spacers often include a plurality of ferrules arranged in side-by-side relation and secured, for example, by welding to one another to form the support matrix of the spacer for the nuclear fuel rods. Generally, each ferrule includes circumferentially spaced protuberances or stops on one side and a spring assembly along an opposite side of the ferrule from the protuberances for centering and biasing each fuel rod against the protuberances, thereby maintaining the fuel rods in fixed relation one to the other across the spacer. Generally, the role of a spacer in a fuel bundle is to position the fuel rods for peak performance and to protect the fuel rod assembly during possible loading events, such as handling and shipping. The spacer itself, however, constitutes an obstacle to bundle performance in that its cross-section interferes with the flow of water/moderator through the bundle. An ideal spacer would have minimal impact on bundle performance (thermal hydraulics, critical power), while still restraining the rods in their intended positions and protecting them. Consequently, an optimum spacer should have as little cross-section as possible, use a minimum amount of material and simultaneously meet structural requirements for positioning and protecting the fuel rods.

DISCLOSURE OF THE INVENTION

According to the present invention, there is provided a spacer which employs ferrules to capture and retain the nuclear fuel rods in the bundle in the intended array. Ferrules are employed because of their excellent structural integrity as compared with other possible cross-sectional shapes. By shortening the height of the ferrule in accordance with the present invention, the structural integrity of the ferrule is retained, while simultaneously, the magnitude of the material employed in each ferrule, and hence the spacer, is greatly reduced. A separate spring, also having a reduced quantity of material, is provided for each ferrule and along a side thereof opposite a pair of stops formed along the interior ferrule surface. The spring constitutes a leaf spring having a spring body in a generally closed H-shaped configuration lying in a plane with side legs and end crosspieces, as well as an intermediate crosspiece interconnecting the side legs. The end crosspieces carry end portions projecting to one side of the plane and the intermediate crosspiece has a central portion between the end portions projecting to the opposite side of the plane. The spring is open on opposite sides of the intermediate crosspiece between it and the end crosspieces. Each of the end and central projecting portions carries a boss projecting to the same side of the plane.

2

Each ferrule includes a pair of circumferentially spaced indented portions, i.e., stops, for contacting a fuel rod disposed within the ferrule. Along the opposite side of the ferrule from the indented portions are three vertically spaced openings in the ferrule body, i.e., a pair of end openings and an opening intermediate the end openings. The spring and ferrule are sized and configured such that the end crosspieces and intermediate crosspiece of the spring when the spring is applied between adjacent ferrules lie in lateral registry with the end openings and central opening of the ferrule, respectively.

In assembly, the spring lies between adjacent ferrules with the intermediate crosspiece extending within and its intermediate projection extending through the central opening of a first ferrule for locating its boss against the fuel rod disposed within the first ferrule to bias the latter against the opposing contacting portions of the ferrule. The end crosspieces of the spring register with and lie partly within the end openings of the first ferrule with the end projections in bearing engagement on the opposite side of the plane of the spring along the side of the adjacent or second ferrule. The bosses of the end portions, however, project through the end openings of the first ferrule beyond the inside diameter surface of the first ferrule. In this manner, should relative movement between the first ferrule and the fuel rod contained in the first ferrule cause the fuel rod to lie close to the interior surface of the first ferrule adjacent the spring, it will come into contact with the bosses of the end projections, preventing full engagement of the fuel rod against the wall of the first ferrule.

It will be also appreciated that the laterally extending crosspieces of the spring bear against the side margins of the openings in the ferrule. This provides stability to the spring against flow-induced vibration at a multiplicity of locations about the ferrule. Further, the end projections have a radius corresponding to the radius of the ferrule whereby at least two spaced contact points along the spring end projections, and preferably all points therealong, engage the adjacent ferrule, affording further stability to the springs.

In a preferred embodiment according to the present invention, there is provided a sub-assembly for a spacer useful in a nuclear fuel bundle for maintaining a matrix of a plurality of nuclear fuel rods passing through the spacer in spaced-apart relation, comprising first and second ferrules lying adjacent one another for receiving respective nuclear fuel rods, each ferrule having fuel rod contacting points along one side of the ferrule for abutting a fuel rod within the ferrule and end openings and an opening intermediate the end openings along a side of the ferrule opposite the one side, a spring including a spring body lying in a plane and having opposite end portions projecting to one side of the plane, a central portion intermediate the end portions projecting to the opposite side of the plane and openings on opposite sides of the central portion between the central portion and the end portions, the spring being disposed between the adjacent ferrules with the central portion projecting through the intermediate opening of the first ferrule for bearing against the fuel rod within the first ferrule and maintaining the fuel rod against the fuel rod contacting points of the first ferrule, the end portions lying in registry with the end openings of the first ferrule for bearing directly against the second ferrule between a pair of the fuel rod contacting points of the second ferrule.

In a further preferred embodiment according to the present invention, there is provided a spacer for maintaining a matrix of nuclear fuel rods in spaced-apart relation between upper and lower tie plates, the spacer assembly comprising a matrix of adjacent ferrules for receiving the fuel rods in the spacer, each ferrule having a pair of fuel rod contacting points along one side thereof for abutting a fuel rod within the ferrule and having end openings and an opening intermediate the end openings along a side of the ferrule opposite the one face, a plurality of springs, each spring including a spring body lying in a plane and having opposite end portions projecting to one side of the plane, a central portion intermediate the end portions projecting to the opposite side of the plane and openings on opposite sides of the central portion and between the central portion and the end portions, each spring being disposed between an adjacent pair of the ferrules with the central portion of the spring in the intermediate opening of one ferrule of the adjacent pair of ferrules and the end portions of the spring lying in registry with the end openings of the one ferrule for bearing directly against another ferrule of the adjacent pair thereof, each adjacent pair of ferrules having an axial dimension greater than a dimension between the end portions of the springs therebetween.

Accordingly, it is a primary object of the present invention to provide a novel and improved spacer for the nuclear fuel rods of a nuclear fuel bundle wherein the spacer has a reduced height and particularly a reduced height flat spring for spacer ferrules with improved coolant/moderator flow characteristics and improved protection against flow-induced vibration.

BRIEF DESCRIPTION OF THE DRAWINGS

FIG. 8 is a cross-sectional view of a pair of adjacent ferrules with the spring interposed therebetween and generally taken about on line 8—8 in FIG. 9; and FIG. 9 is a side elevational view of a pair of adjacent ferrules and spring therebetween according to the present invention.

BEST MODE FOR CARRYING OUT THE INVENTION

Figure 1:
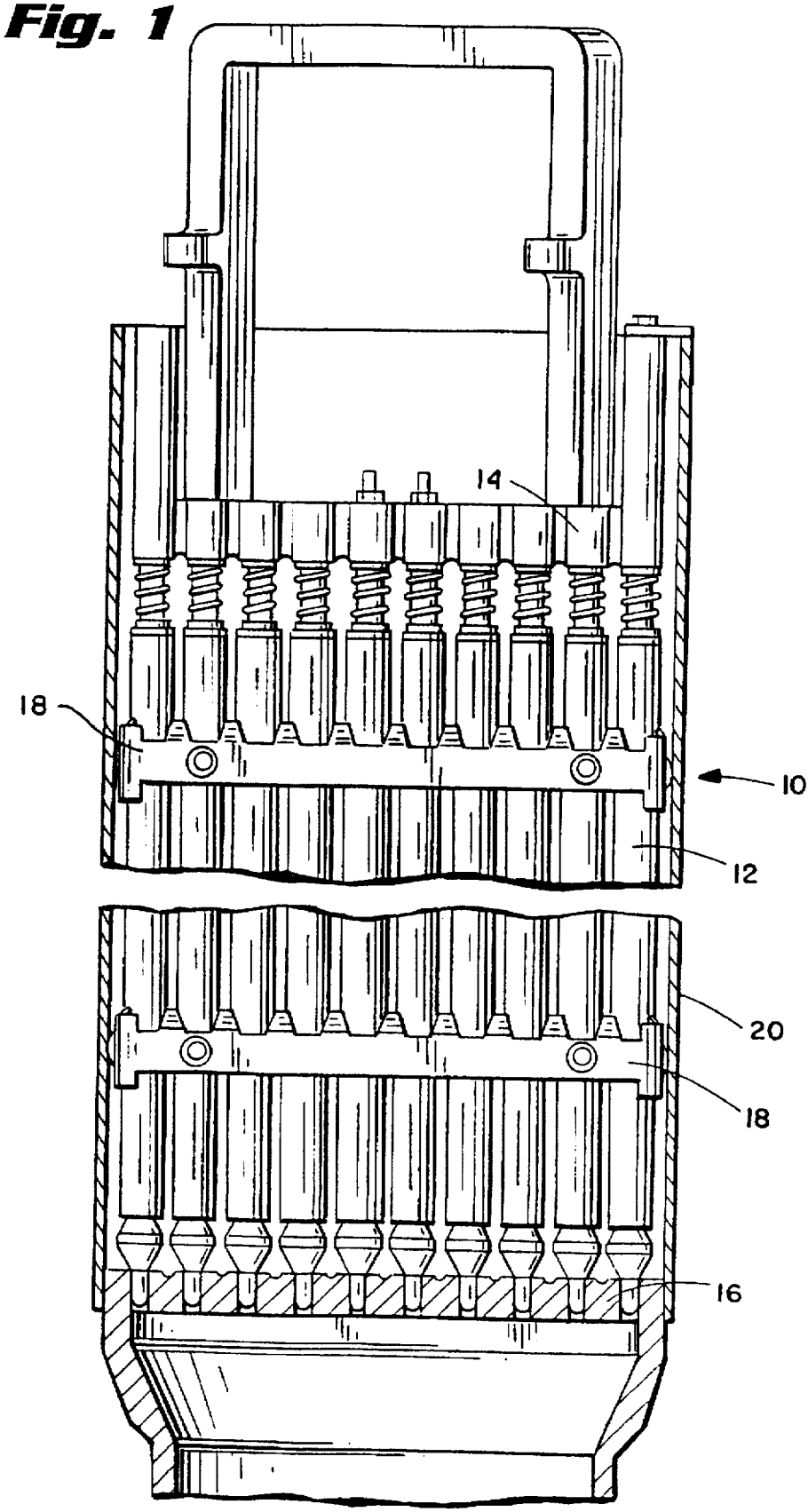
FIG. 1 is a fragmentary cross-sectional view of a nuclear fuel bundle with pads broken out and in cross-section for ease of illustration.

Referring now to FIG. 1, there is illustrated a nuclear fuel assembly, generally designated 10, including a plurality of fuel elements or rods 12 supported between an upper tie plate 14 and a lower tie plate 16. Fuel rods 12 pass through a plurality of fuel rod spacers 18 at vertically spaced positions along the fuel bundle. The spacers 18 provide intermediate support to retain the elongated fuel rods 12 in spaced relation relative to one another and to restrain the fuel rods from lateral vibration. With reference to FIG. 1, a 10×10 array of fuel rods is illustrated. It will be appreciated, however, that the invention hereof is applicable to arrays of fuel rods of different numbers, for example, 8×8 or 10×10 arrays, or a 9×9 array of fuel rods as disclosed in FIG. 2 in a spacer 18a.

Each fuel rod is formed of an elongated tubular cladding material, with nuclear fuel pellets and other materials sealed in the tube by end plugs. The lower end plugs register in bores formed in the lower tie plate 16, while the upper end plugs are disposed in cavities in the upper tie plate 14. Additionally, the fuel rod assembly includes a channel 20 substantially square in cross-section, sized to form a sliding fit over the upper and lower tie plates and the spacers so that the nuclear fuel bundle, including the channel, tie plates, rods and spacers can be removed.

Figure 2:
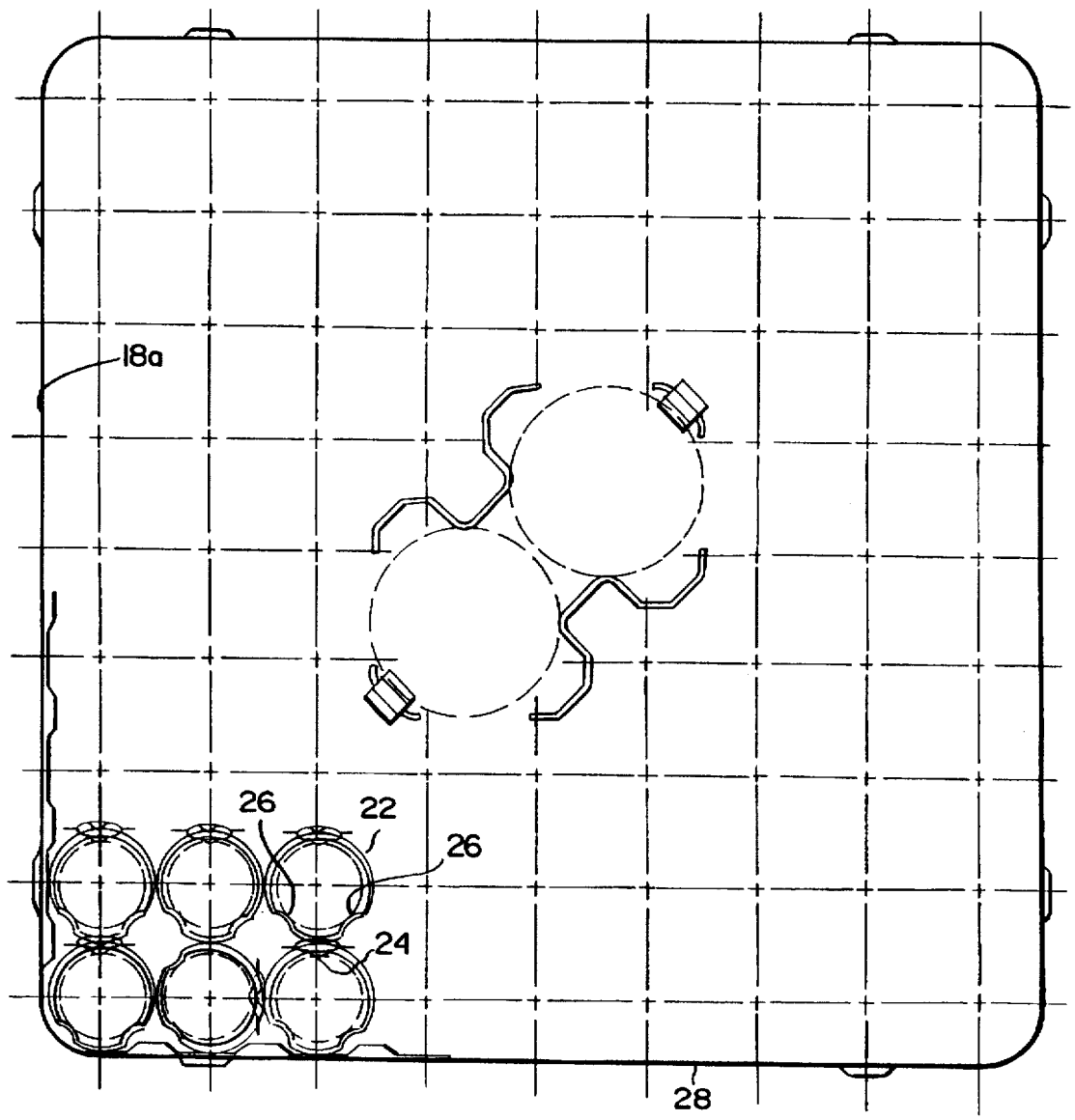
FIG. 2 is a plan view of a spacer showing the ferrule and spring assemblies of the present invention with the remaining pads of the spacer being schematically illustrated.

Turning to FIG. 2, spacer 18a is constructed in accordance with the present invention and has a plurality of individual ferrules 22 and springs 24, each ferrule having an associated spring and disposed between adjacent ferrules. The ferrules 22 are arranged in a square matrix in which each ferrule receives a fuel rod and maintains the fuel rod spaced and restrained relative to adjoining fuel rods. The spring 24 is provided each ferrule for purposes of biasing the fuel rod in a lateral direction against stops 26 along the side of the ferrules opposite the springs whereby the fuel rods are maintained in a predetermined position relative to one another and in the spacer 18a. Each spacer 18a also includes a marginal band 28.

Figure 3:
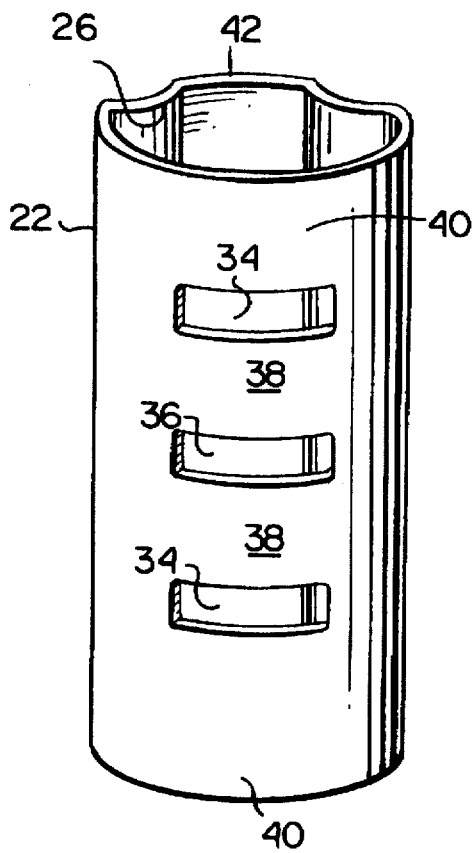
FIG. 3 is a perspective view of a ferrule according to the present invention.

Referring now to FIG. 3, each spacer ferrule 22 has a generally cylindrical configuration. The wall of each cylindrical ferrule is indented at circumferentially spaced locations along one side of the ferrule to form inwardly directed stops or fuel rod contact portions 26. It will be appreciated that the stops 26 extend the full height of the ferrule, although the stops could be provided at axially spaced locations along the height of the ferrule. Each ferrule 22 also includes a plurality of openings along a side thereof opposite the side containing stops 26. Particularly, three, preferably rectilinear openings are provided: a pair of end openings 34 and an opening 36 intermediate the end openings 34. The intermediate opening 36 is straddled by circumferentially extending bands 38 of the ferrule 22, while bands of ferrule material 40 extend between the end openings 34 and the opposite ends of the ferrule 22. The ferrules are symmetrically disposed within the spacer 18, with the side portion 42 of each ferrule bearing against the band portions 38 and 40 of the adjacent ferrule. Also, the opposite sides of the ferrules (the sides of the ferrule 90° from side portion 42 and band portions 38, 40) engage one another. Preferably the ferrules are welded one to the other in the spacer 18 at their areas of engagement.

Figure 4:
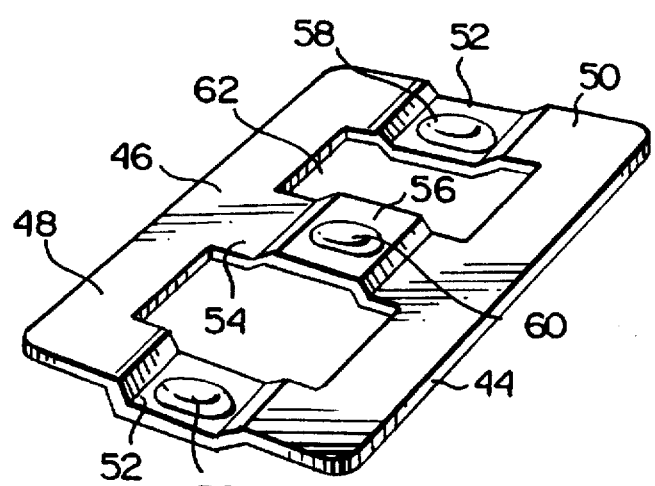
FIG. 4 is a perspective view of a spring for use between adjacent ferrules according to the present invention.
Figure 5:
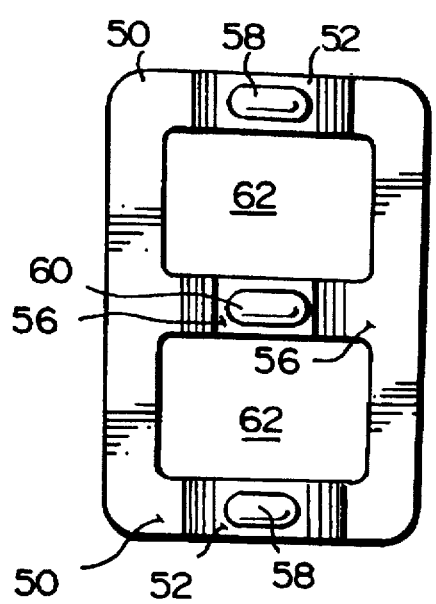
FIG. 5 is an elevational view of the spring of FIG. 4.
Figure 6:
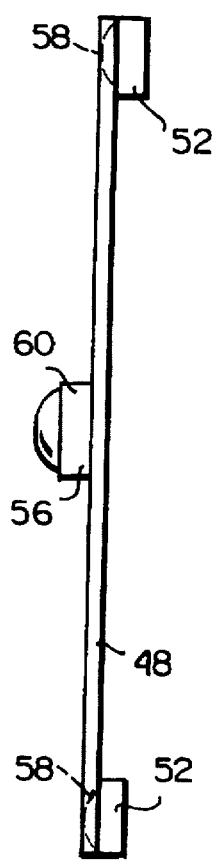
FIG. 6 is an enlarged side elevational view of the spring of FIG. 4 and 5.

Referring now to FIGS. 4 and 5, there is illustrated a spring 44 for use with each of the ferrules 22, the spring lying between adjacent ferrules. Spring 44 includes a flat leaf spring-type body 46 having sides 48 and crosspieces extending across the spring between the sides 48, the sides 48 and crosspieces lying in a plane. End crosspieces 50 have portions 52 which project to one side of the plane. Intermediate crosspiece portion 54 includes a central portion 56 which projects to the opposite side of the plane of the spring. Each of the projecting end portions 52 has a convexly-shaped boss or dimple 58 which projects toward the plane of the spring, while the central portion 56 has a convexly-shaped dimple or boss 60 which projects in the same direction as bosses 58 and away from the plane of the spring. It will be appreciated that the intermediate crosspiece 54 and end crosspieces 50 are spaced from one another to define a pair of openings 62 on opposite sides of intermediate crosspiece 54 and bounded by intermediate crosspiece 54, end crosspieces 50 and sides 48. The end crosspieces 50 and intermediate crosspiece 54 are sized and configured to lie in registry and for disposition within the openings 34 and 36 of the ferrule 22. The openings 62 in the spring 44 are sized to receive the ferrule band portions 38 which straddle the intermediate opening 36.

Figure 7:
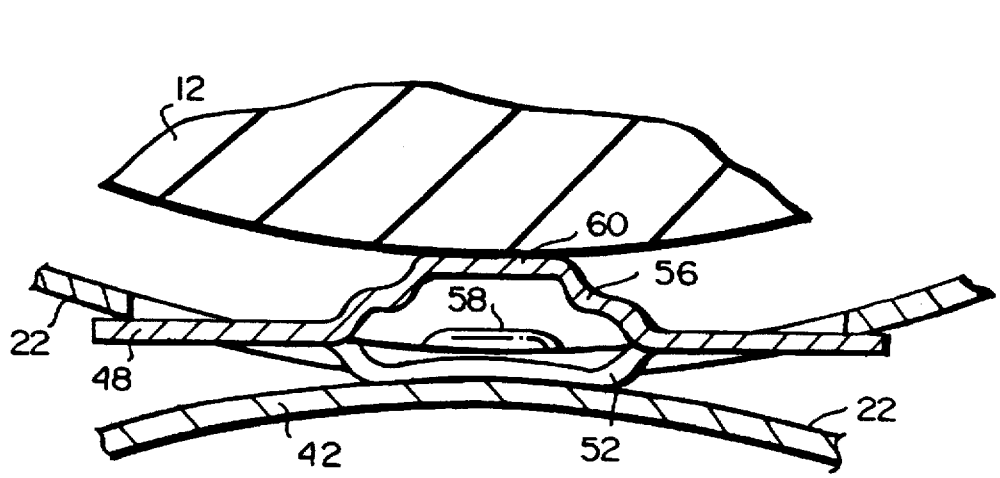
FIG. 7 is an enlarged fragmentary cross-sectional view illustrating the contact between the spring, fuel rod and adjacent ferrules.

To assemble the spacer, the adjacent ferrules are secured one to the other with the springs in place. That is, the springs are located prior to assembly with the central projection 56 entering into and passing through the central opening 36 of a ferrule 22. The end crosspieces 50 lie within the openings 34 with the end projections 52 lying in registry with the end openings 34 and projecting away from the spring and openings 34. The ferrules are then welded to one another to capture the springs in that configuration between the adjacent ferrules. It will be appreciated that the sides 48 as illustrated in FIG. 7 lie outside of both of the adjacent ferrules, with the end crosspieces 50 and intermediate crosspiece 54 engaging the outer side margins of the respective openings. Consequently, with that engagement and the engagement of the central boss 60 against a fuel rod 12 in the first ferrule 22 and the side 42 of the adjacent ferrule engaging the end projections 52, the spring is stabilized in the spacer. Moreover, the stabilization occurs at a number of discrete locations along the spring, i.e., along each of the opposite sides of the spring at three locations where the crosspieces 50 and 54 engage the margins of the openings 34 and 36. Stabilization is further provided by the engagement of the intermediate projection with the fuel rod in the first ferrule and further provided by the engagement of the end projections 52 with the adjacent ferrule along its side 42. Preferably, the arc of the end projections 52 corresponds to the arc of the ferrule along side 42 whereby an arcuate contact between the end projections 52 and the ferrule portion 42 can be effected. This stabilizes the spring against flow-induced vibrations without the necessity of physically securing, for example, welding, the spring in the spacer. Note also that the vertical extent of the spring is less than the vertical or axial extent of the ferrule with the opposite ends of the spring terminating short of the upper and lower edges of the ferrule. Thus, the spring does not project above or below the spacer and thereby offers reduced resistance to coolant/moderator flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sub-assembly for a spacer useful in a nuclear fuel bundle for maintaining a matrix of a plurality of nuclear fuel rods passing through the spacer in spaced-apart relation, comprising:

first and second ferrules lying adjacent one another for receiving respective nuclear fuel rods, each ferrule having fuel rod contacting points along one side of the ferrule for abutting a fuel rod within the ferrule and discrete closed end openings and a discrete closed opening intermediate said end openings along a side of the ferrule opposite said one side;

a spring including a spring body lying in a plane and having opposite end portions projecting to one side of said plane, a central portion intermediate said end portions projecting to the opposite side of said plane and discrete closed openings through said spring body and on opposite sides of said central portion between said central portion and said end portions;

said spring being disposed between said adjacent ferrules with said central portion projecting through said intermediate opening of said first ferrule for bearing against the fuel rod within said first ferrule and maintaining the fuel rod against the fuel rod contacting points of said first ferrule, said end portions lying in registry with said end openings of said first ferrule and bearing directly against an outside surface of said second ferrule between a pair of said fuel rod contacting points of said second ferrule.

2. A sub-assembly according to claim 1 wherein said central portion of said spring has a boss projecting therefrom for engaging the fuel rod within said first ferrule.

3. A sub-assembly according to claim 1 wherein said first and second ferrules have generally parallel axes, said openings in said first ferrule and said end portions and said central portion of said spring each having an axial extent so that said end portions and said central portion lie in close-fitting relation to said end and said intermediate openings, respectively.

4. A sub-assembly according to claim 1 wherein opposite edges of said first and second ferrules define an axial dimension greater than a dimension between said end portions of said spring.

5. A sub-assembly according to claim 1 wherein said contacting points comprise indentations along the sides of the ferrules extending the full axial length of the ferrules.

6. A sub-assembly according to claim 1 wherein said end portions of said spring have a radius corresponding to a radius of the second ferrule thereby affording stability to the spring.

7. A sub-assembly according to claim 1 wherein said central portion of said spring has a boss projecting therefrom for engaging the fuel rod within said first ferrule, said first ferrule having an inside diameter, said end portions having bosses projecting therefrom in a direction toward said first ferrule, passing through said end openings of said first ferrule and terminating within said first ferrule radially inwardly of said inside diameter thereof, said end portions of said spring have a radius corresponding to a radius of the second ferrule thereby affording stability to the spring, said first and second ferrules having generally parallel axes, said openings in said first ferrule and said end portions and said central portion of said spring each having an axial extent so that said end portions and said central portion lie in close-fitting relation to said end and said intermediate openings, respectively, opposite edges of said first and second ferrules defining an axial dimension greater than a dimension between said end portions of said spring.

8. A sub-assembly according to claim 1 wherein said first ferrule has an inside diameter, said end portions having bosses projecting therefrom in a direction radially inwardly of said first ferrule, passing through said end openings of said first ferrule and terminating within said first ferrule radially inwardly of said inside diameter thereof for engagement by the fuel rod within said first ferrule.

9. A sub-assembly according to claim 8 wherein said central portion of said spring has a boss projecting therefrom for engaging the fuel rod within said first ferrule.

10. A spacer for maintaining a matrix of nuclear fuel rods in spaced-apart relation between upper and lower tie plates, said spacer assembly comprising:

a matrix of adjacent ferrules for receiving the fuel rods in said spacer;

each ferrule having a pair of fuel rod contacting points along one side thereof for abutting a fuel rod within the ferrule and having discrete closed end openings and a discrete closed opening intermediate said end openings along a side of the ferrule opposite said one side;

a plurality of springs, each spring including a spring body lying in a plane and having opposite end portions projecting to one side of said plane, a central portion intermediate said end portions projecting to the opposite side of said plane and discrete closed openings through said spring body and on opposite sides of said central portion and between said central portion and said end portions;

each said spring being disposed between an adjacent pair of said ferrules with said central portion of said spring in said intermediate opening of one ferrule of said adjacent pair of ferrules and said end portions of said spring lying in registry with said end openings of said one ferrule [for]and bearing directly against an outside surface of another ferrule of said adjacent pair thereof, each said adjacent pair of ferrules having an axial dimension greater than a dimension between said end portions of said springs therebetween.

11. A spacer according to claim 10 wherein said central portion of each said spring has a boss projecting therefrom for engaging the fuel rod within said one ferrule.

12. A spacer according to claim 10 wherein each said adjacent pair of ferrules have generally parallel axes, said openings in said one ferrule and said end portions and said central portion of said spring each having an axial extent so that said end portions and said central portion lie in close-fitting relation to said end and said intermediate openings, respectively.

13. A spacer according to claim 10 wherein opposite edges of said adjacent pairs of ferrules define an axial dimension greater than a dimension between said end portions of said springs.

14. A spacer according to claim 10 wherein said contacting points comprise indentations along the sides of the ferrules extending the full axial length of the ferrules.

15. A spacer according to claim 10 wherein said spring end portions have a radius corresponding to a radius of said another ferrule thereby affording stability to the spring.

16. A spacer according to claim 10 wherein said central portion of each said spring has a boss projecting therefrom for engaging the fuel rod within said one ferrule, said one ferrule having an inside diameter, said end portions having bosses projecting therefrom in a direction toward said one ferrule, passing through said end openings of said one ferrule and terminating within said one ferrule radially inwardly of said inside diameter thereof, said spring end portions having a radius corresponding to a radius of said another ferrule thereby affording stability to the spring, each said adjacent pair of ferrules having generally parallel axes, said openings in said one ferrule and said end portions and said central portion of said spring each having an axial extent so that said end portions and said central portion lie in close-fitting relation to said end and said intermediate openings, respectively, wherein opposite edges of said adjacent pairs of ferrules define an axial dimension greater than a dimension between said end portions of said springs.

17. A spacer according to claim 10 wherein said one ferrule has an inside diameter, said end portions having bosses projecting therefrom in a direction radially inward of said one ferrule, passing through said end openings of said one ferrule and terminating within said one ferrule radially inwardly of said inside diameter thereof for engagement by the fuel rod with said one ferrule.

18. A spacer according to claim 17 wherein said central portion of each said spring has a boss projecting therefrom for engaging the fuel rod within said one ferrule.

* * * * *